(12) United States Patent
Kobashi

(10) Patent No.: US 10,240,642 B2
(45) Date of Patent: Mar. 26, 2019

(54) FILM TRANSFER TOOL

(71) Applicant: PLUS CORPORATION, Tokyo (JP)

(72) Inventor: Yoshihiko Kobashi, Tokyo (JP)

(73) Assignee: Plus Corporation, Tokyo (JP)

( * ) Notice: Subject to any disclaimer, the term of this patent is extended or adjusted under 35 U.S.C. 154(b) by 436 days.

(21) Appl. No.: 15/140,698

(22) Filed: Apr. 28, 2016

(65) Prior Publication Data

US 2016/0332835 A1 Nov. 17, 2016

(30) Foreign Application Priority Data

May 12, 2015 (JP) .................................. 2015-097082

(51) Int. Cl.
    *F16D 7/02* (2006.01)
    *B43L 19/00* (2006.01)
    *B65H 35/00* (2006.01)

(52) U.S. Cl.
    CPC .............. *F16D 7/021* (2013.01); *B43L 19/00* (2013.01); *B65H 35/0033* (2013.01); *B65H 2403/731* (2013.01)

(58) Field of Classification Search
    CPC .......... B65H 35/0033; B65H 2403/731; B65H 37/00; B65H 37/007; F16D 7/021
    See application file for complete search history.

(56) References Cited

U.S. PATENT DOCUMENTS

RE25,056 E  * 10/1961 Fritzinger .......... B65H 35/0033
    12/142 R
4,851,076 A  *  7/1989 Manusch .................. B05C 1/14
    156/577
5,379,477 A  *  1/1995 Tamai .................. B65H 37/007
    118/257
5,499,877 A  *  3/1996 Sakanishi ............ B65H 37/007
    400/193
6,418,997 B1 *  7/2002 Tamai .................. B65H 37/007
    118/257
6,521,045 B1 *  2/2003 Koyama .............. B65H 37/007
    118/200
6,830,089 B1 * 12/2004 Tamai .................. B65H 37/007
    118/257

(Continued)

FOREIGN PATENT DOCUMENTS

JP      2009-285883 A      12/2009

*Primary Examiner* — William A. Rivera
(74) *Attorney, Agent, or Firm* — The Marbury Law Group, PLLC

(57) ABSTRACT

A film transfer tool that can be restored to a normal use state easily even though a small degree of sticking takes place in a transfer tape includes a supply bobbin, a take-up bobbin, a supply-side rotational shaft that is fixed to the supply bobbin, a take-up side rotational shaft that is fixed to the take-up bobbin, a ratchet shaft that is connected rotationally to the supply-side rotational shaft, a first rotational connection mechanism that connects the supply-side rotational shaft and the take-up side rotational shaft together rotationally and which includes a first clutch and a second rotational connection mechanism that connects the ratchet shaft and the take-up side rotational shaft together rotationally via a locking claw that is a ratchet rotational member. A ratio of a rotation speed of the ratchet rotational member to a rotation speed of the ratchet shaft is set to be greater than one.

12 Claims, 7 Drawing Sheets

(56) References Cited

U.S. PATENT DOCUMENTS

2011/0120659 A1* 5/2011 Narita ................ B43L 19/0068
156/577
2017/0369268 A1* 12/2017 Nakamura .............. B43L 19/00

* cited by examiner

FILM TRANSFER TOOL

CROSS-REFERENCE TO RELATED APPLICATION

This application is based upon and claims the benefit of priority under 35 USC 119 from Japanese Patent Application No. 2015-097082 filed on May 12, 2015, the entire disclosure of which, including the description, claims, drawings and abstract, is incorporated herein by reference.

BACKGROUND OF THE INVENTION

Field of the Invention

The present invention relates to a film transfer tool that transfers a transfer layer of a transfer tape on to a transfer receiving surface.

Description of the Related Art

Film transfer tools have conventionally been provided for application to transferring a correction tape or a glue tape. For example, Japanese Unexamined Patent Application No. 2009-285883 discloses a film transfer tool in which even though an amount of the used tape that has been taken up by a take-up bobbin is increased to thereby increase the tension in a transfer tape, the tension is lessened.

This film transfer tool includes a holder on which a transfer head is provided and a supply bobbin that is pivotally supported on a case. This holder is kept staying in an initial position by a position controlling member. Then, the take-up bobbin is pivotally supported on the holder. When the film transfer tool is used with the tension increased, the holder moves as a result of the transfer head being pressed against a transfer surface, and the take-up bobbin is caused to move towards a supply bobbin, whereby the tension in the transfer tape is lessened.

According to the film transfer tool disclosed in Patent Literature 1 that is the Japanese Unexamined Patent Application No. 2009-285883 described above, the increase in tension in the transfer tape is eliminated which is caused by the increase in the amount of the transfer tape taken up by the take-up bobbin in the normal use. However, it is difficult for the transfer tape to move also when a small degree of sticking takes place due to an accumulation of dust such as waste of a rubber eraser picked up by the transfer tape on the transfer receiving surface or part of the transfer layer of the transfer tape clogging up a portion in the case where the transfer tape passes, which increases the tension in the transfer tape. Then, the transfer operation becomes heavy. However, in the film transfer tool disclosed in Patent Literature 1, the small degree of sticking described above cannot be eliminated. Then, even in the event that the supply bobbin is forced to rotate as a result of a forced transfer operation, a clutch mechanism provided in an interlocking mechanism that rotationally connects the supply bobbin and the take-up bobbin together is actuated to operate, and only the supply bobbin is made to rotate.

SUMMARY OF THE INVENTION

An object of the invention is to provide a film transfer tool which can be restored to a normal use state even in the event that a small degree of sticking of a transfer tape takes place.

According to an aspect of the invention, there is provided a film transfer tool including a supply bobbin around which an unused transfer tape is wound and which is supported rotationally, a take-up bobbin around which the used portion of the transfer tape is wound and which is supported rotationally, a supply-side rotational shaft that is fixed to the supply bobbin, a take-up side rotational shaft that is fixed to the take-up bobbin, a ratchet shaft that is connected rotationally to the supply-side rotational shaft, a first rotational connection mechanism that rotationally connects the supply-side rotational shaft and the take-up side rotational shaft together and which includes a first clutch, and a second rotational connection mechanism that includes a ratchet rotational member that can be brought into locking engagement with the ratchet shaft and which rotationally connects the ratchet shaft and the take-up side rotational shaft via the ratchet rotational member, wherein a ratio of a rotation speed of the ratchet rotational member to a rotation speed of the ratchet shaft is greater than one.

The film transfer tool is configured so that the second rotational connection mechanism includes a second clutch.

In addition, the film transfer tool is configured so that a clutch force of the second clutch is smaller than a clutch force of the first clutch.

Additionally, in the film transfer tool, the first rotational connection mechanism and the second rotational connection mechanism are connected together rotationally by a plurality of gears and are disposed on one side surface relative to the supply bobbin and the take-up bobbin.

In addition, in the film transfer tool, the ratchet shaft is concentric with the supply-side rotational shaft and includes ratchet teeth that are formed on an outer circumference thereof, and the ratchet rotational member includes a locking claw that is formed so as to be brought into locking engagement with the ratchet teeth, and the locking claw is biased in the direction of a center of the ratchet shaft.

According to the film transfer tool of the invention, in a normal transfer operation, the supply-side rotational shaft rotates as the supply bobbin rotates. Then, when the supply-side rotational shaft rotates, the take-up bobbin is rotated by the first rotational connection mechanism that connects together the supply-side rotational shaft and the take-up side rotational shaft. Then, a difference in rotation speed between the supply bobbin and the take-up bobbin (in other words, a difference between a feeding amount and a take-up amount of the transfer tape) is adjusted by the first clutch. On the other hand, the supply-side rotational shaft and the ratchet shaft are connected together rotationally. Then, the ratio of the rotation speed of the ratchet rotational member to the rotation speed of the ratchet shaft is made to be greater than one. Consequently, in the normal transfer operation, the ratchet rotational member can be rotated at a higher rotation speed than the rotation speed of the ratchet shaft, whereby the ratchet rotational member is allowed to spin.

Here, when a small degree of sticking of the transfer tape takes place, the take-up bobbin stops rotating. However, in case a forced transfer operation is performed to rotate the supply bobbin, with the first clutch caused to slip, only the supply bobbin, the supply-side rotational shaft and the ratchet shaft that is connected rotationally to the supply-side rotational shaft can be rotated. Then, since the ratchet rotational member stops rotating, the ratchet shaft and the ratchet rotational member can be brought into locking engagement with each other. When the ratchet shaft is brought into locking engagement with the ratchet rotational member, the rotational force is transmitted to the second rotational connection mechanism.

In this way, when the small degree of sticking of the transfer tape takes place, by transmitting the rotational force to the second rotational connection mechanism, the take-up bobbin can be rotated to take up the transfer tape, or the supply bobbin and the take-up bobbin are caused to stop rotating so that the user can be made to sense that the transfer tape is sticking. Therefore, the sticking state of the transfer tape can easily be eliminated to restore the normal transfer operation.

In addition, by providing the second clutch on the second rotational connection mechanism, even in case a small degree of sticking of the transfer tape takes place whereby the rotational force is transmitted to the second rotational connection mechanism, the difference in rotation speed between the supply bobbin and the take-up bobbin can be adjusted by the second clutch. Consequently, even in case a small degree of sticking of the transfer tape takes place in the normal transfer operation, the take-up bobbin is rotated by continuing to perform the transfer operation, whereby the small degree of sticking of the transfer tape can be eliminated so as to restore the normal transfer operation.

Additionally, in the event that the clutch force of the second clutch is smaller than the clutch force of the first clutch, even in case the transfer mode is switched from the normal transfer operation to the transfer operation for the small degree of sticking due to the small degree of sticking taking place, a change in operation effort to operate the film transfer tool can be reduced. Consequently, the user of the film transfer tool can continue to use the film transfer tool without feeling the sensation of physical disorder.

The first rotational connection mechanism and the second rotational connection mechanism are connected together rotationally by the plurality of gears and are disposed on the one surface side relative to the supply bobbin and the take-up bobbin. This enables the film transfer tool to be fabricated compact.

The ratchet shaft is concentric with the supply-side rotational shaft and includes the ratchet teeth that are formed on the outer circumference thereof. Then, the ratchet rotational member constitutes a locking claw that is brought into locking engagement with the ratchet teeth. By doing so, the film transfer tool can be fabricated more compact.

DETAILED DESCRIPTION OF THE PREFERRED EMBODIMENT

Figure 1A:
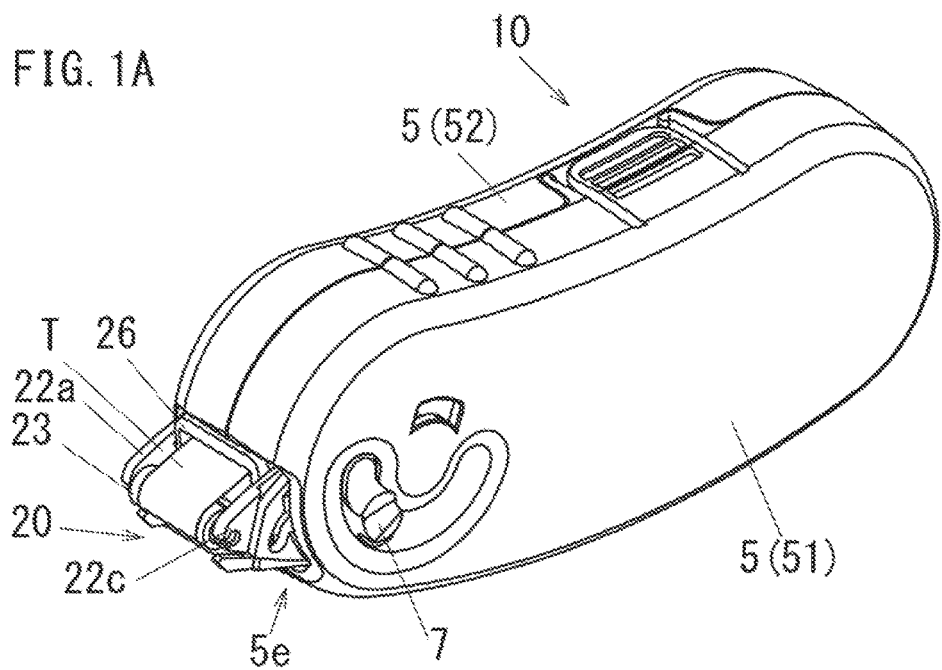
FIG. 1A shows an in-use state of a film transfer tool according to an embodiment of the invention.
Figure 1B:
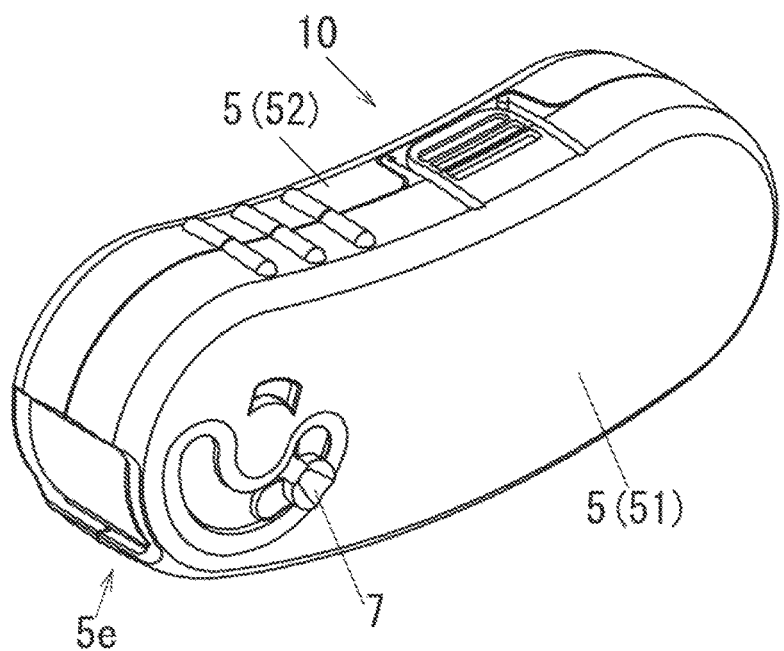
FIG. 1B shows a retracted state of a film transfer tool according to an embodiment of the invention.

Hereinafter, an embodiment of the invention will be described based on the drawings. FIG. 1A is perspective views of an in-use state of a film transfer tool 10. FIG. 1B is perspective views of a retracted state of a film transfer tool 10. The film transfer tool 10 includes a case main body 5. The film transfer tool 10 includes a transfer head 20 that transfers a transfer layer of a transfer tape T on to a transfer receiving surface. This transfer head 20 is provided so as to project from and retract into the case main body 5. In the following description, an end portion of the film transfer tool 10 where the transfer head 20 is provided will be referred to as a front thereof, and an opposite end portion of the film transfer tool 10 will be referred to as a rear thereof. When the film transfer tool 10 is seen from the rear to the front, a left side of the film transfer tool 10 will be referred to as a left thereof, and a right side of the film transfer tool 10 will be referred to as a right thereof. Additionally, in FIGS. 1A and 1B, an upper side of the film transfer tool 10 will be referred to as a top thereof, and a lower side of the film transfer tool 10 will be referred to as a bottom thereof.

A projection and retraction control of the retractable transfer head 20 can be performed by a projection and retraction control lever 7 that is provided on a side surface of the case main body 5. In performing a transfer operation by the film transfer tool 10 that transfers the transfer layer of the transfer tape on to the transfer receiving surface, firstly, as shown in FIG. 1A, the transfer head 20 is caused to project from the case main body 5 by the projection and retraction control lever 7. Then, the user grips on the case main body 5 and pulls it backwards with the transfer head 20 pressed against the transfer receiving surface. Then, after the transfer operation is finished, the transfer head 20 is retracted into the case main body 5 as shown in FIG. 1B by the projection and retraction control lever 7, whereby the film transfer tool 10 can be put in a transfer head retracted state.

Next, an interior configuration of the film transfer tool 10 will be described by reference to FIGS. 2 and 3 that show exploded perspective views of the film transfer tool 10. The case main body 5 is made up of a left case 51 and a right case 52 that can be separated and connected together. The left case 51 and the right case 52 each have a substantially shell-like shape that is elongated in a front-to-rear direction. As shown mainly in FIG. 3, locked portions 51a, 51b are provided individually on upper and lower edges of the left case 51. Then, a guide plate 51c having a flat plate-like shape is provided on an inner surface of the left case 51 that lies near an edge of a front lower side thereof so as to extend therefrom. Further, a first guide pillar 51d having a circular cylindrical shape is provided on an inner surface of the left case 51 that lies near an edge of a rear lower side thereof so as to extend therefrom. Then, a second guide pillar 51j having a circular cylindrical shape is provided on an inner surface of the left case 51 that lies near an edge of a slightly front upper side thereof so as to extend therefrom.

Figure 2:
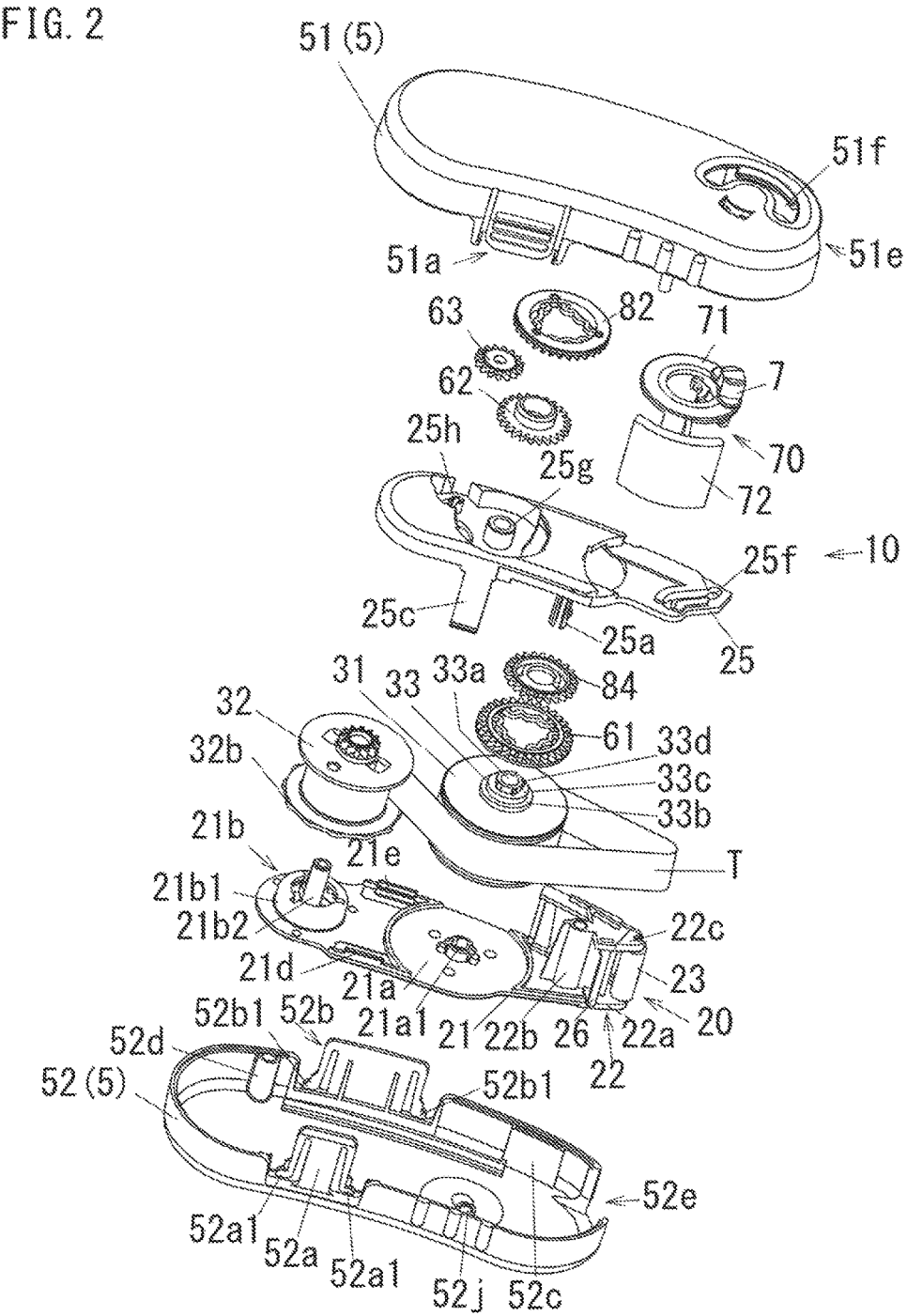
FIG. 2 is an exploded perspective view of the film transfer tool according to the embodiment of the invention as seen from a left front thereof.

On the other hand, as shown mainly in FIG. 2, locking portions 52a, 52b are provided on upper and lower edges of the right case 52. Then, a guide plate inserting portion 52c is formed on an edge portion on a front lower side of the right case 52. Further, a first guide pillar inserting portion 52d having a circular cylindrical shape is formed on an edge portion of a rear lower side of the right case 52. Then, a second guide pillar inserting portion 52j is provided on a slightly front upper edge portion thereof.

The left case 51 and the right case 52 are connected together by the locking portions 52a, 52b being brought into locking engagement with the locked portions 51a, 51b, respectively. Specifically speaking, two locking claws 52a1 that are provide at a front and rear of the locking portion 52a so as to be sprung oppositely and two locking claws 52b1 that are provided at a front and rear of the locking portion 52b so as to be sprung oppositely are locked respectively in corresponding locking portions (not shown) that are provided on the locked portions 51a, 51b. In addition, as this occurs, the guide plate 51c is inserted into the guide plate inserting portion 52c. Then, the first guide pillar 51d is inserted into the first guide pillar inserting portion 52d, and the second guide pillar 51j is inserted into the second guide pillar inserting portion 52j. Consequently, the left case 51 and the right case 52 are guided to be connected together.

In separating the left case 51 and the right case 52, when push plates that are provided individually on the locked portions 51a, 51b are pushed, the two locking claws 52a1 and the two locking claws 52b1 each move towards each other against spring back forces thereof, whereby the locking engagements with the corresponding locking portions of the locked portions 51a, 51b are released, whereby the left case 51 and the right case 52 can be separated from each other.

A left opening portion 51e and a right opening portion 52e are formed on the left case 51 and the right case 52, respectively, by cutting out front end portions thereof. When the left case 51 and the right case 52 are connected together, an opening portion 5e (refer to FIGS. 1A and 1B) is formed by the left opening portion 51e and the right opening portion 52e. The transfer head 20 projects from and retracts into this opening portion 5e. Additionally, as shown mainly in FIG. 2, an arc-shaped hole portion 51f is formed on a front outer surface of the left case 51 from which the projection and rejection retraction control lever 7 protrudes.

Figure 3:
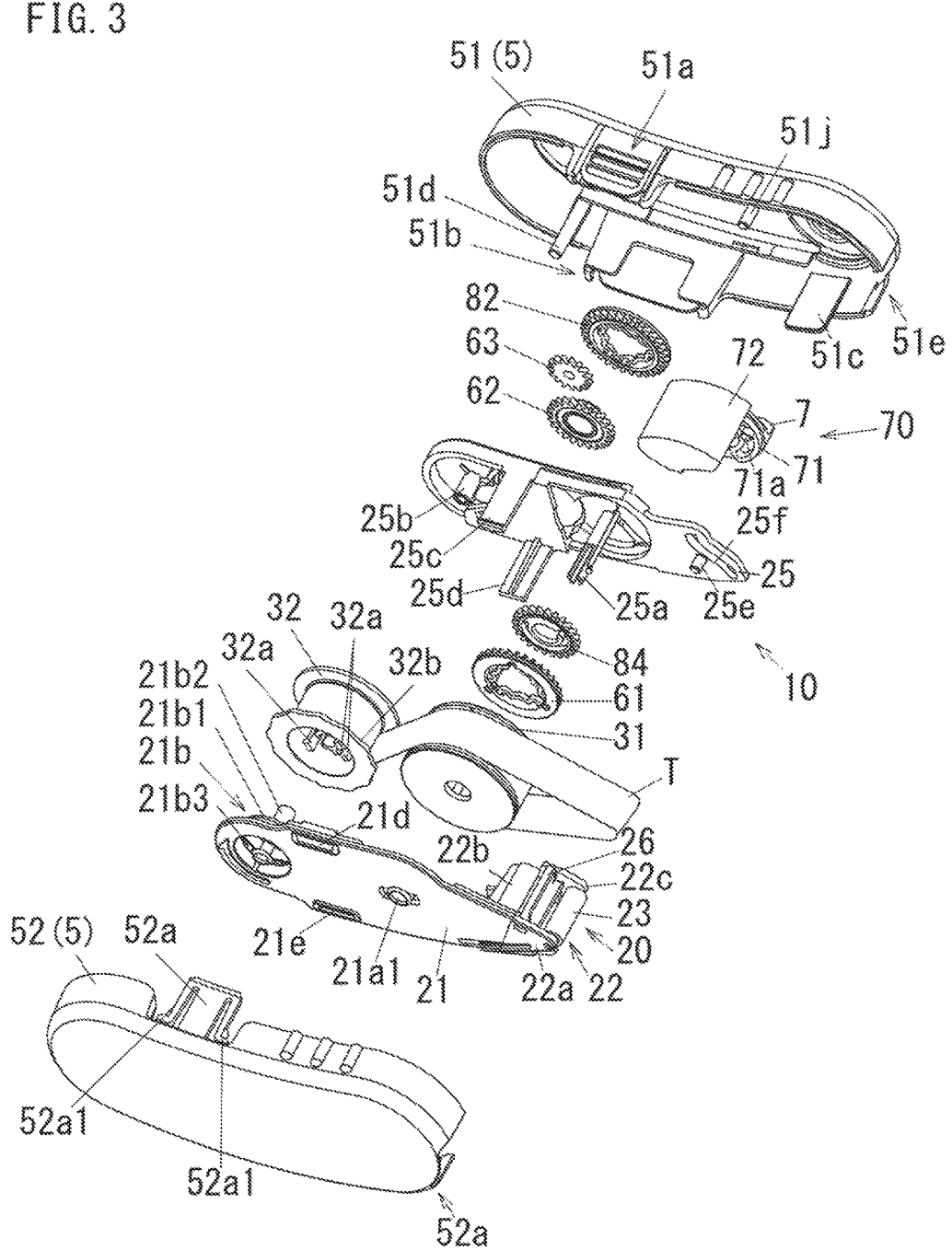
FIG. 3 is an exploded perspective view of the film transfer tool according to the embodiment of the invention as seen from a right front thereof.

On the other hand, as shown in FIGS. 2 and 3, a base plate 21 that is elongated in the front-to-rear direction is provided on the transfer head 20. A transfer roller support portion 22 is formed at a front end of the base plate 21. A transfer roller 23 is supported rotatably on the transfer roller support portion 22. The transfer roller support portion 22 includes a right support portion 22a that supports a right end of the transfer roller 23. Then, a support cylinder 22b is provided on an inner surface of the base plate 21 that lies near a front end portion thereof (in other words, on a rear side of the right support portion 22a) so as to stand upright therefrom. The support cylinder 22b is made up of a cylindrical portion having a cylindrical shape and a rib portion that supports this cylindrical portion.

Then, a left support portion 22c having a plate-like shape is formed so as to extend forwards from a left end of the support cylinder 22b. This left support portion 22c supports rotatably a left end of the transfer roller 23. Consequently, the transfer roller 23 is supported rotatably by the left support portion 22c and the right support portion 22a. Then, the base plate 21 and the transfer roller support portion 22 (the right support portion 22a, the support cylinder 22b, the left support portion 22c) are formed integrally.

A guard frame 26 is provided on an upper side of the transfer roller support portion 22, and this guard frame 26 has a bridge-like shape and spans between the right support portion 22a and the left support portion 22c.

A supply bobbin bearing portion 21a where a supply bobbin 31 is disposed is formed at a substantially central portion on a left side surface of the base plate 21. An insertion hole 21a1 is formed at a substantially central portion of the supply bobbin bearing portion 21a. A supply bobbin support shaft 25a supporting the supply bobbin 31, which will be described later, is inserted into the insertion hole 21a1 to be fixed in place.

A take-up bobbin bearing portion 21b where a take-up bobbin 32 is disposed is formed on a rear side of the supply bobbin bearing portion 21a on the left side surface of the base plate 21. The take-up bobbin bearing portion 21b includes an annular bearing portion 21b1 that projects in a ring-like fashion and a take-up bobbin right support shaft 21b2 is provided at a center of the annular bearing portion 21b1 so as to stand upright therefrom.

As shown in FIG. 3, a reverse rotation preventing ratchet tooth 21b3 is formed on an inner circumferential surface of the annular bearing portion 21b1. The ratchet tooth 21b3 can be brought into locking engagement with a plurality of locking claws 32a that protrude to the right from an inside of a barrel portion of the take-up bobbin 32. The take-up bobbin 32 is allowed to rotate only in a direction indicated by an arrow shown at the rear of a right side surface of the base plate 21 (that is, a take-up direction) by the ratchet tooth 21b3 and the locking claws 32a, whereby the take-up bobbin 32 is prevented from rotating reversely.

Locking elongated holes 21d, 21e are provided near upper and lower edge portion of the base plate 21 and slightly rearwards of a center of the base plate 21 in the front-to-rear direction, respectively. The locking elongated holes 21d, 21e are formed as holes that are elongated in the front-to-rear direction when seen from the side.

As shown mainly in FIG. 3, a holding plate 25 is disposed in a position that faces the left side surface of the base plate 21. The supply bobbin support shaft 25a, which is described above, is provided substantially at a center of a right side surface of the holding plate 25 in the front-to-rear direction so as to extend perpendicularly from the right side surface. A take-up bobbin left support shaft 25b is provided near a rear end portion of the right side surface of the holding plate 25 so as to extend perpendicularly from the right side surface. Then, connecting plates 25c, 25d are provided respectively on upper and lower edge portions of the holding plate 25 and slightly rearwards in the front-to-rear direction so as to extend to the right. Hook-like locking portions are formed at distal end portions of the connecting plates 25c, 25d.

An inserting projection 25e having a cylindrical shape is provided near a front end portion on the right side surface of the holding plate 25 so as to extend perpendicularly therefrom. Further, a cam portion 25f is formed on a front side of the inserting projection 25e. The cam portion 25f is formed as a hole that is opened from an upper side towards a lower side of the holding plate 25.

As shown in FIG. 2, a gear support shaft 25g having a cylindrical shape is provided on a left side surface of the holding plate 25 so as to extend perpendicularly from the left side surface. Then, a small gear support shaft 25h is provided on a rear side and below the gear support shaft 25g so as to extend perpendicularly from the left side surface. A substantially circular recess portion is formed on a circumference of each of the gear support shaft 25g and the small gear support shaft 25h for installation of corresponding gears. Then, opening portions are formed in circumferential walls of these recess portions so that gears disposed on the left side surface and gears disposed on the right side surface of the holding plate 25 can mesh with each other through the openings.

Figure 4:
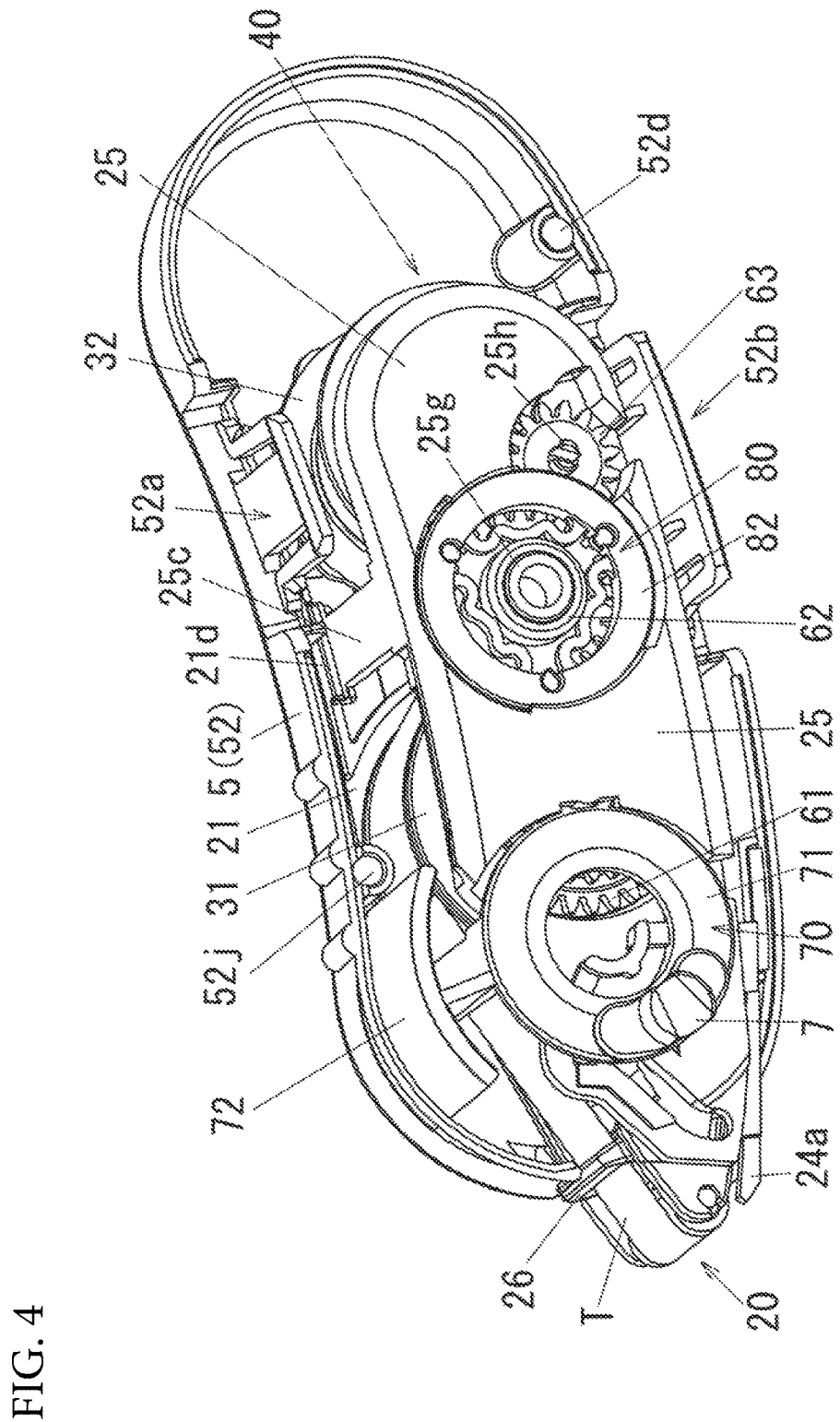
FIG. 4 is a perspective view of the film transfer tool according to the embodiment of the invention with a left case removed.

The supply bobbin 31 and the take-up bobbin 32 are disposed between the base plate 21 and the holding plate 25 (refer to FIG. 4). The locking portions at the distal end portion of the connecting plates 25c, 25d are brought into locking engagement with the locking elongated holes 21d, 21e, respectively. As this occurs, the supply bobbin support shaft 25a is brought into locking engagement with the insertion hole 21a1 so as to support the supply bobbin 31 rotatably. The take-up bobbin left support shaft 25b and the take-up bobbin right support shaft 21b2 are aligned coaxially. By doing so, the take-up bobbin 32 is supported rotatably. Then, the inserting projection 25e is inserted into the cylindrical portion of the support cylinder 22b.

In this way, as shown in FIG. 4, the supply bobbin 31, the take-up bobbin 32, the plurality of gears and the transfer head 20 are disposed between the base plate 21 and the holding plate 25, and a plurality of gears are provided on the left side surface of the holding plate 25, whereby a refill unit 40 is formed. Then, the holding plate 25 and the base plate 21 are partially guided by guide rails that are formed on inner surfaces of the left case 51 and the right case 52, whereby the refill unit 40 is supported so as to move freely back and forth relative to the case main body 5.

On the other hand, a projection and retraction shutter member 70 is disposed rotatably in a front portion that is defined between the holding plate 25 and the left case 51. As shown in FIGS. 2 and 3, too, the projection and retraction shutter member 70 includes an annular portion 71 and a shutter portion 72 on which a curved surface is formed which has a convex shape when seen from the side. A follower portion 71a is formed on a right side surface of the annular portion 71 so as to protrude into a cylindrical shape to the right. This follower portion 71a is brought into engagement with the cam portion 25f.

Consequently, by operating the projection and retraction control lever 7, the projection and retraction shutter member 70 is rotated, and the follower portion 71a moves relatively along the cam portion 25f. Then, the refill unit 40 moves back and forth relative to the case main body 5. Then, the transfer head 20 project from and retracts into the opening portion 5e of the case main body 5 in association with the back and forth movement of the refill unit 40. Further, the shutter portion 72 is also rotated by a rotational operation of the projection and retraction control lever 7. Thus, the opening portion 5e is opened and closed in association with the projection and retraction of the transfer head 20.

In a transfer operation, the transfer tape T is fed from the supply bobbin 31 and is then taken up by the take-up bobbin 32 as follows. An unused transfer tap T that is wound around the supply bobbin 31 is fed from a lower side of the supply bobbin 31. Then, the transfer tape T is fed to the transfer roller 23, where a transfer layer of the transfer tape T is transferred on to a transfer receiving surface by the transfer roller 23. Thereafter, the transfer tape T goes around the transfer roller 23, passes on a lower side of the guard frame 26 and is sent into the case main body 5. The transfer tape T that is sent into the case main body 5 is brought into contact with an upper side of the unused transfer tape T that is wound around the supply bobbin 31 and is then turned downwards, whereafter the transfer tape T is taken up by the take-up bobbin 32 from a lower side of the take-up bobbin 32.

Next, an interlocking mechanism will be described which rotates the supply bobbin 31 and the take-up bobbin 32 in an interlocked fashion. As shown in FIG. 2, an inserting shaft 33 is inserted into the center of the supply bobbin 31. The inserting shaft 33 is fixed to the supply bobbin 31, and a through hole 33a is formed in the center of the inserting shaft 33 for insertion of the supply bobbin support shaft 25a. A portion of the inserting shaft 33 that protrudes from a left side surface of the supply bobbin 31 is formed into a substantially circular disc shape of three stages. In this three-stage substantially circular disc portion, a portion where the inserting shaft 33 protrudes from the left side surface of the supply bobbin 31 constitutes a portion where a large-diameter collar portion 33b is disposed on the left side surface of the supply bobbin 31. A first clutch shaft 33c having a small diameter than that of the collar portion 33b is formed on a left side of the first clutch shaft 33c. Similarly, a ratchet shaft 33d having a smaller diameter than that of the first clutch shaft 33c is formed on a left side of the first clutch shaft 33c. The collar portion 33b, the first clutch shaft 33c and the ratchet shaft 33d are disposed concentrically with the supply bobbin 31.

Next, arrangements of gears that make up the interlocking mechanism of the supply bobbin 31 and the take-up bobbin 32 will be described based on FIGS. 5 and 6. A first clutch gear 61 is disposed on the left side surface of the supply bobbin 31. As shown in FIG. 6, three wave-formed clutch springs 61a are provided at three locations inside the first clutch gear 61. An outer circumferential surface of the first clutch shaft 33c is inscribed in the three clutch springs 61a. The clutch springs 61a are formed from a resin material and are made to be sprung back in a radial direction of the first clutch gear 61. Consequently, the first clutch shaft 33c and the three clutch springs 61a make up a first clutch 60 in which the first clutch shaft 33c and the clutch springs 61a start to slip on each other at a predetermined clutch force.

The first clutch gear 61 meshes with an intermediate gear 62 that is disposed on a rear side of the first clutch gear 61. A cylindrical second clutch shaft 62a is provided in the center of the intermediate gear 62 so as to extend perpendicularly from a left side surface of the intermediate gear 62. A shaft hole 62b is formed open in the center of the second clutch shaft 62a. The gear support shaft 25g provided on the left side surface of the holding plate 25 is inserted into this shaft hole 62b, whereby the intermediate gear 62 is supported rotatably (refer to FIG. 4).

A small gear 63 is disposed at the rear and below the intermediate gear 62, so that the intermediate gear 62 meshes with the small gear 63. The small gear 63 is supported rotatably by the small gear support shaft 25h on the holding plate 25 (refer to FIG. 4). On the other hand, a fixed gear 64 is provided at the center of a left side surface of the take-up bobbin 32. The fixed gear 64 is fixed relative to the take-up bobbin 32. Thus, the small gear 63 meshes with the fixed gear 64.

In addition, a second clutch gear 82 is provided on the intermediate gear 62 concentrically therewith. Three wave-formed clutch springs 82a are provided in an inner circumference of the second clutch gear 82. An outer circumferential surface of the second clutch shaft 62a of the intermediate gear 62 is inscribed in the three clutch springs 82a. Then, the three clutch springs 82a are formed from a resin material and are made to be sprung back in a radial direction. Consequently, the second clutch shaft 62a and the three clutch springs 82a make up a second clutch 80 in which the second clutch shaft 62a and the clutch springs 82a start to slip on each other at a predetermined clutch force (refer to FIGS. 4 and 5).

A ratchet gear 84 is provided on a front side of the second clutch gear 82. The ratchet gear 84 is disposed on the inserting shaft 33 that is concentric with the supply bobbin 31 and the first clutch gear 61. The second clutch gear 82 meshes with the ratchet gear 84.

An arc-shaped spring portion 84a is formed on an inner circumferential surface of the ratchet gear 84. A locking claw 84b is formed at a distal end portion of the spring portion 84a. The locking claw 84b is biased radially inwards (in other words, towards a shaft center of the ratchet shaft 33*d*) by the spring portion 84*a*. This locking claw 84*b* and the ratchet teeth on the outer circumference of the ratchet shaft 33*d* make up a ratchet mechanism.

Figure 5:
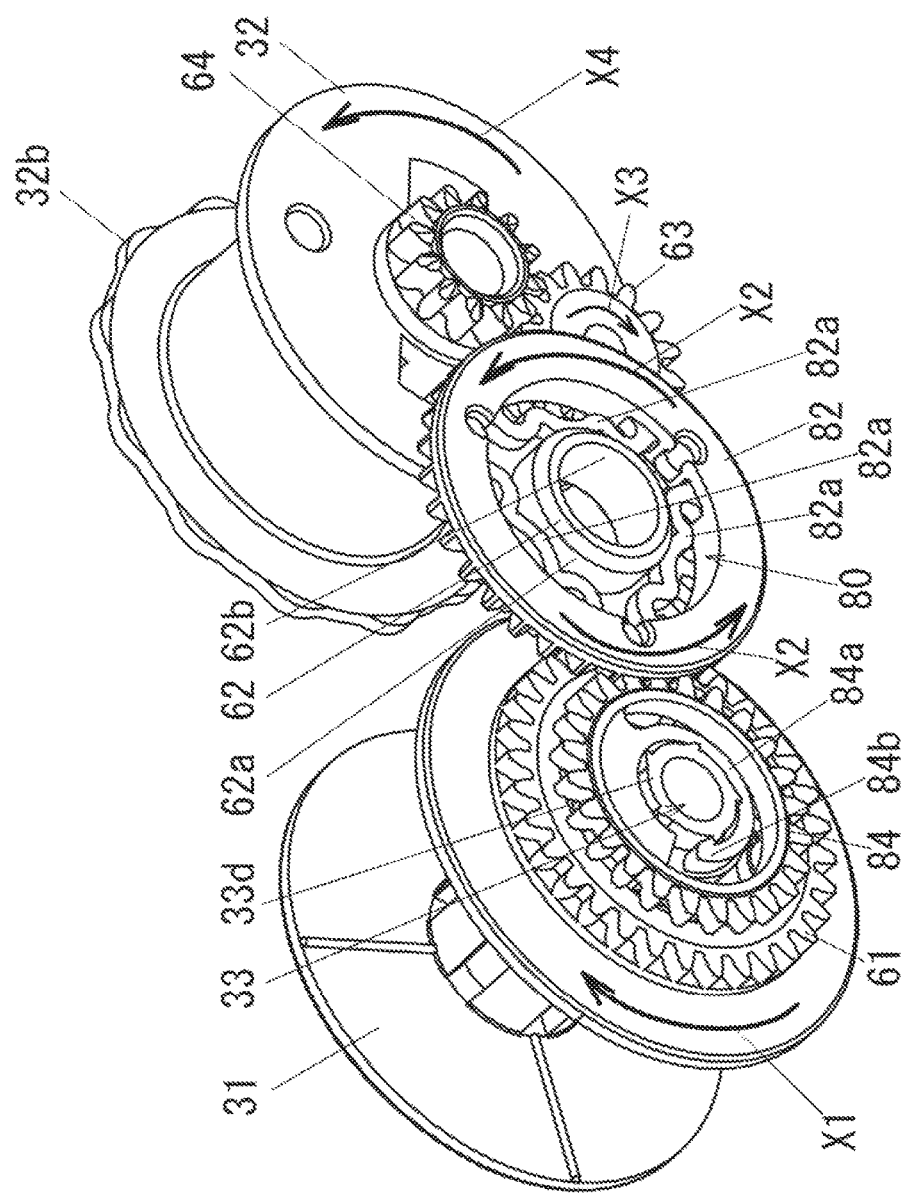
FIG. 5 is a perspective view showing an interlocking mechanism of the film transfer tool according to the embodiment of the invention.
Figure 6:
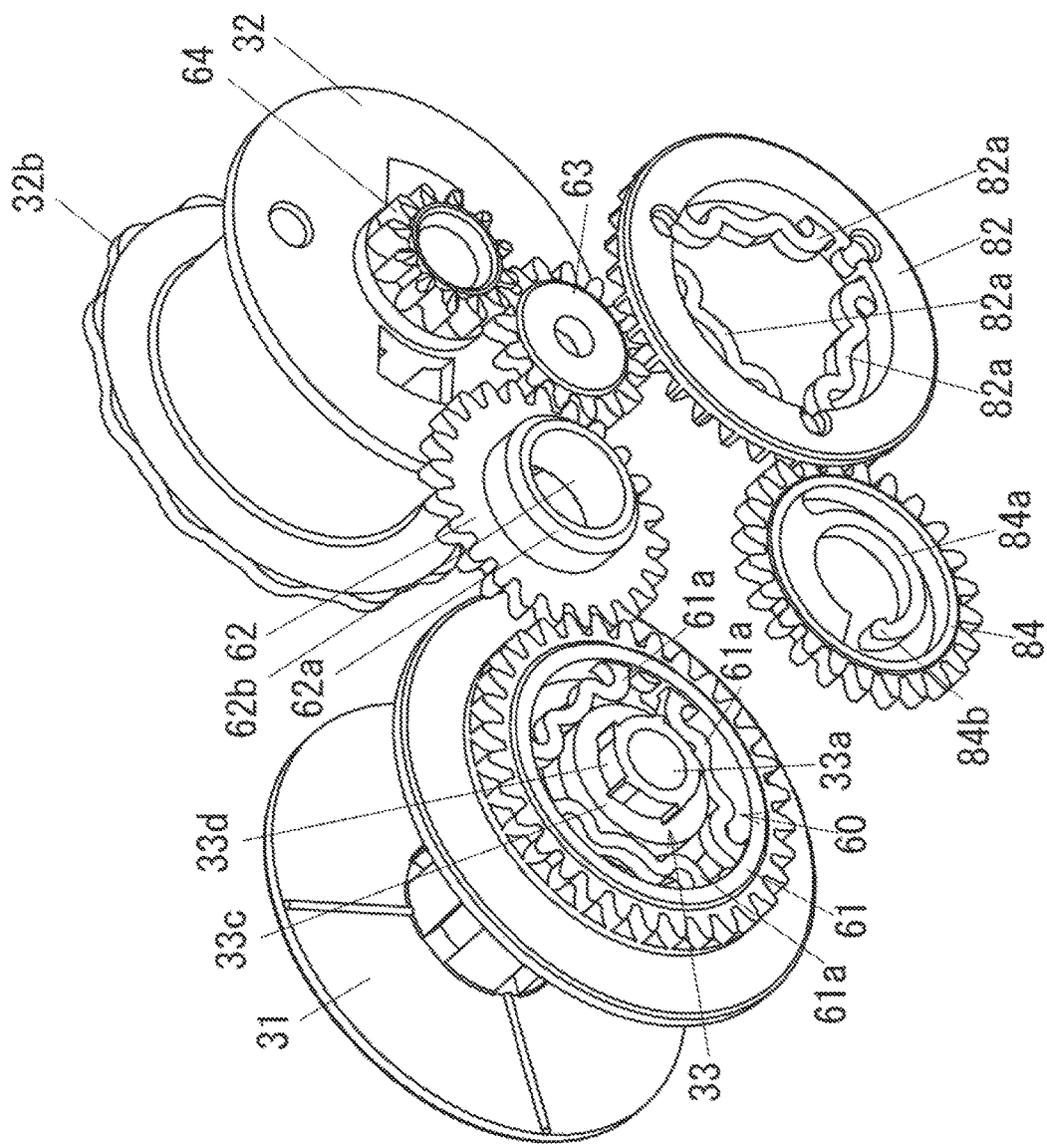
FIG. 6 is a partially exploded view of the interlocking mechanism of the film transfer tool according to the embodiment of the invention.

As shown in FIG. 5, in this ratchet mechanism, when the ratchet gear 84 rotates clockwise when viewed from the left side surface (a direction indicated by an arrow X1) relative to the ratchet shaft 33*d*, the locking claw 84*b* rides over the ratchet teeth, whereby the ratchet gear 84 is allowed to rotate. On the other hand, when the ratchet gear 84 rotates counterclockwise when viewed from the left side surface (an opposite direction to the direction indicated by the arrow X1) relative to the ratchet shaft 33*d*, the locking claw 84*b* is locked on one of the ratchet teeth.

In relation to the numbers of teeth of the gears (the first clutch gear 61, the intermediate gear 62, the small gear 63, the fixed gear 64, the second clutch gear 82 and the ratchet gear 84) of the interlocking mechanism, when the ratchet shaft 33*d* and the ratchet gear 84 rotate in the direction indicated by the arrow X1, a ratio of the rotation speed of the locking claw 84*b* to the rotation speed of the ratchet shaft 33*d* (the rotation speed of the locking claw 84*b*/the rotation speed of the ratchet shaft 33*d*) is set to be greater than one.

Next, the operation of the interlocking mechanism of the film transfer tool 10 will be described. When the film transfer tool 10 is used with the transfer head 20 projecting from the opening portion 5*e* as a normal use, the supply bobbin 31 rotates clockwise when viewed from the left side surface as indicated by the arrow X1 in FIG. 5. Then, the intermediate gear 62 that meshes with the first clutch gear 61 rotates counterclockwise when viewed from the left side surface (a direction indicated by an arrow X2). Then, since the intermediate gear 62 meshes with the small gear 63, the small gear 63 rotates counterclockwise when viewed from the left side surface (a direction indicated by an arrow X3). The fixed gear 64 that meshes with the small gear 63 rotates counterclockwise when viewed from the left side surface (a direction indicated by an arrow X4). Since the fixed gear 64 is fixed to the take-up bobbin 32, the take-up bobbin 32 rotates in the same direction as the direction in which the fixed gear 64 rotates (the direction indicated by the arrow X4). In this way, the used transfer tape T, in other words, the transfer tape T that is fed from the supply bobbin 31 and whose transfer layer is transferred at the transfer roller 23 is taken up by the take-up bobbin 32.

In addition, the second clutch gear 82 rotates counterclockwise when viewed from the left side surface (the direction indicated by the arrow X2) in the same way as the intermediate gear 62 does via the second clutch shaft 62*a*. Then, the ratchet gear 84 that meshes with the second clutch gear 82 rotates clockwise when viewed from the left side surface (the direction indicated by the arrow X1).

Here, as has been described before, the ratio of the rotation speed of the locking claw 84*b* to the rotation speed of the ratchet shaft 33*d* that rotates together with the supply bobbin 31 is set to be greater than one. Consequently, the ratchet gear 84 rotates in the direction X1 at a higher rotation speed than that of the inserting shaft 33. Namely, the locking claw 84*b* of the ratchet gear 84 rotates in the direction indicated by the arrow X1 relative to the ratchet shaft 33*d*. Consequently, the locking claw 84*b* rotates in such a way as to ride over the ratchet teeth. In other words, the ratchet gear 84 spins relative to the inserting shaft 33.

In this normal use state, the number of teeth of the fixed gear 64 is smaller than the number of teeth of the first clutch gear 61, and the diameter of the barrel portion of the take-up bobbin 32 is greater than that of the supply bobbin 31. Consequently, the take-up bobbin 32 rotates faster than the supply bobbin 31. Owing to this, an amount of the transfer tape T that is taken up by the take-up bobbin 32 is set to be greater than an amount of the transfer tape T that is fed by the supply bobbin 31. Then, an excessive amount of the taken up transfer tape T over the amount of the fed transfer tape T is adjusted as required by the action of the first clutch 60. In other words, a difference in rotation speed between the supply bobbin 31 and the take-up bobbin 32 is adjusted as required by the first clutch 60.

Next, an operation of the film transfer tool 10 when a sticking of the transfer tape T takes place will be described. There is such a situation that a small degree of sticking of the transfer tape T takes place due to an accumulation of waste of a rubber eraser resulting from a rubbing out operation or part of a transfer layer (in particular, a glue substance of a glue tape) that is left not transferred near the guard frame 26 or along a passageway through which the used transfer tape T passes until it is taken up by the take-up bobbin 32. As this occurs, the interlocking mechanism operates as follows.

In the event that a small degree of sticking of the transfer tape T takes place, the transfer tape T stops traveling. Consequently, the take-up bobbin 32 also stops moving. Thus, the fixed gear 64 that is fixed to the take-up bobbin 32, the small gear 63, the intermediate gear 62 and the first clutch gear 61 also stop moving. Further, the second clutch gear 82 and the ratchet gear 84 also stop moving. In the event that the supply bobbin 31 is forced to rotate by performing the transfer operation further, since the first clutch gear 61 does not move, the first clutch 60 is actuated as a result of the clutch springs 61*a* slip on the outer circumference of the first clutch shaft 33*c*. Then, only the supply bobbin 31 and the inserting shaft 33 that is fixed to the supply bobbin 31 start to rotate in the direction indicated by the arrow X1 or the direction X1.

When the inserting shaft 33 starts rotating in the direction X1, since the first clutch gear 61 does not move as described above, the locking claw 84*b* is locked on one of the ratchet teeth of the ratchet shaft 33*d* of the inserting shaft 33. Then, the ratchet gear 84 rotates together with the inserting shaft 33 (the ratchet shaft 33*d*) in the direction X1. Then, the second clutch gear 82 that meshes with the ratchet gear 84 rotates in the direction X2. When the second clutch gear 82 rotates in the direction X2, the intermediate gear 62, which is connected to the second clutch gear 82 via the second clutch 80, rotates together with the second clutch gear 82 in the direction X2. When the intermediate gear 62 rotates in the direction X2, sequentially, the small gear 63 rotates in the direction X3, the fixed gear 64 rotates in the direction X4, and the take-up bobbin 32 is forced to rotate in the direction X4, that is, in a take-up direction, whereby the used transfer tape T can be taken up by the take-up bobbin 32. In this way, the sticking of the transfer tape T is forced to be released, and the normal use state is restored.

Additionally, even in the event that the rotational force of the ratchet shaft 33*d* is transmitted to the take-up bobbin 32 via the locking claw 84*b* that is locked on the ratchet shaft 33*d* so as to rotate the take-up bobbin 32, the amount of the transfer tape T taken up by the take-up bobbin 32 is set to be greater than the amount of the transfer tape T fed by the supply bobbin 31. Then, an excessive amount of the taken up transfer tape T over the amount of the fed transfer tape T (in other words, a difference in rotation speed between the supply bobbin 31 and the take-up bobbin 32) is adjusted as required by the action of the second clutch 80.

In the event that the rotational force of the ratchet shaft 33*d* is transmitted to the take-up bobbin 32 via the locking claw 84*b* that is locked on the ratchet shaft 33*d* so as to rotate the take-up bobbin 32, the first clutch gear 61 is rotated in the direction X1 together with the second clutch gear 82 by means of the rotation of the intermediate gear 62. However, the clutch springs 61*a* of the first clutch gear 61 slip on the outer circumference of the first clutch shaft 33*c*, whereby the first clutch 60 is now in operation.

Thus, the operations have been described separately one by one for the purpose of describing them, however, in an actual transfer operation, a small degree of sticking of the transfer tape T takes place in the process of a normal transfer operation. Even in such a case, however, the supply bobbin 31 is forced to rotate by performing continuously the transfer operation, and the operations described above are performed sequentially, whereby the film transfer tool 10 is restored to the normal state.

In case the transfer tape T sticks strongly and rigidly, the ratchet gear 84 rotates in the direction X1 due to the locking claw 84*b* being in locking engagement with the ratchet teeth of the ratchet shaft 33*d*, whereby even in the event that the second clutch gear 82 rotates in the direction X2, the clutch springs 82*a* slip on the outer circumference of the second clutch shaft 62*a*, thereby actuating the second clutch 80. Then, the intermediate gear 62, the small gear 63 and the fixed gear 64 do not rotate, and hence, the take-up bobbin 32 also does not rotate. In this case, the case main body 5 is disassembled, and a right collar portion 32*b* of the take-up bobbin 32 whose outer circumference has a wave-form shape is operated quietly in a manual fashion to thereby eliminate the sticking of the transfer tape T.

The effort required to operate the film transfer tool 10 (in other words, the force required to pull back the film transfer tool 10) in the normal transfer operation is determined by the magnitude of the clutch force of the first clutch 60. On the other hand, the effort required to perform the transfer operation until the film transfer tool 10 is restored from the sticking state of the transfer tape T to the normal transfer state becomes a clutch force resulting from the total of the clutch force of the first clutch 60 and the clutch force of the second clutch 80. Consequently, in case a difference between the clutch force of the first clutch 60 and the total of the clutch force of the first clutch 60 and the clutch force of the second clutch 80 is reduced to be small, a difference between the effort required for the transfer operation in the normal state and the effort required for the transfer operation in the restored state becomes small, and the user can continue to the transfer operation without noticing the switching between these two states. Specifically speaking, it is preferable that the clutch force of the first clutch 60 is greater on the order of several times than the clutch force of the second clutch 80.

Further, with the second clutch 80 omitted, the second clutch gear 82 and the intermediate gear 62 can be integrated concentrically into a two-stage gear. According to a configuration employing this two-stage gear, even in the event that the transfer operation continues even when a small degree of sticking of the transfer tape T takes place and only the supply bobbin 31 and the inserting shaft 33 rotate in the direction X1, when the ratchet shaft 33*d* and the locking claw 84*b* are brought into locking engagement with each other, the interlocking mechanism does not rotate, whereby no further transfer operation can be performed. As this occurs, the case main body 5 can be disassembled so that the restoration work of the transfer tape T can be performed manually. In this way, by using the two-stage gear into which the second clutch gear 82 and the intermediate gear 62 are integrated with the second clutch gear 82 omitted, the user can sense the sticking of the transfer tape T.

Figure 7A:
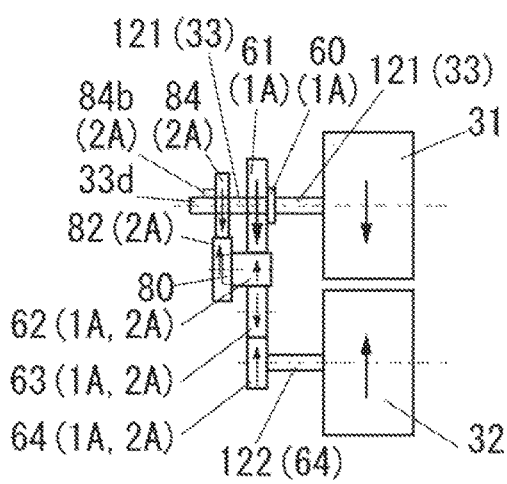
FIG. 7A shows the interlocking mechanism of an embodiment.
Figure 7B:
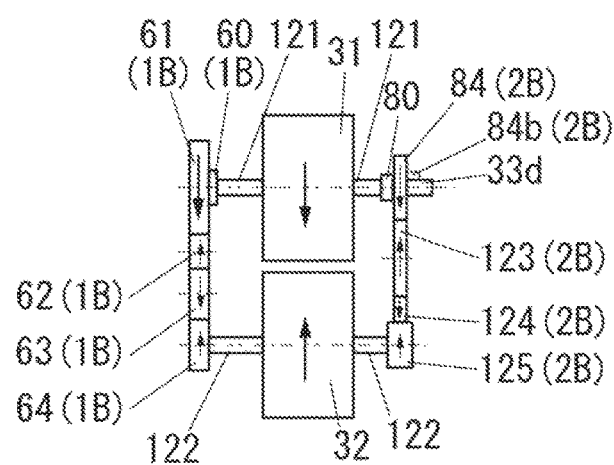
FIGS. 7B and 7C show modified examples of the interlocking mechanism.
Figure 7C:
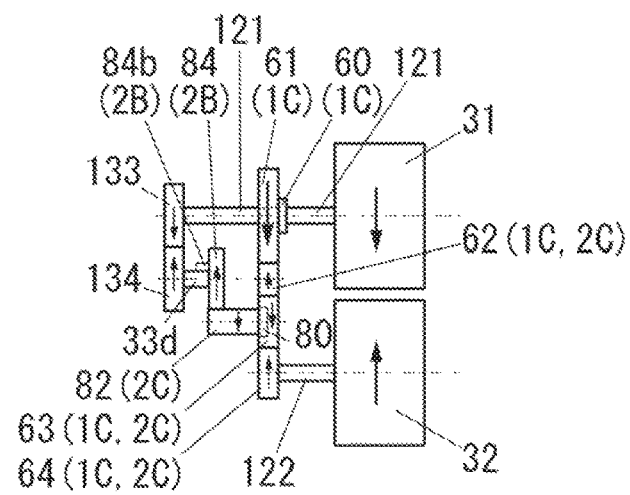

Next, an interlocking mechanism that interlocks the supply bobbin 31 and the take-up bobbin 32 according to this embodiment will be described by reference. FIG. 7A schematically shows the interlocking mechanism. FIG. 7B shows modified examples made to the interlocking mechanism of the embodiment. And FIG. 7C shows modified examples made to the interlocking mechanism of the embodiment. Here, FIGS. 7A to 7C are schematic plan views of the interlocking mechanism, and arrows in the figures indicate directions in which gears rotate.

As shown in FIG. 7A that shows schematically the interlocking mechanism of this embodiment, a supply-side rotational shaft 121 is fixed to the supply bobbin 31. Specifically speaking, the inserting shaft 33 described above corresponds to the supply-side rotational shaft 121. On the other hand, a take-up side rotational shaft 122 is fixed to the take-up bobbin 32. Specifically speaking, the take-up side rotational shaft 122 and the fixed gear 64 are integrated with each other and are then fixed to the take-up bobbin 32.

Then, the first clutch 60, the first clutch gear 61, the intermediate gear 62, the small gear 63 and the fixed gear 64 make up a first rotational connection mechanism 1A. The supply-side rotational shaft 121 and the take-up side rotational shaft 122 are connected rotationally so as to transmit a rotational force by the first rotational connection mechanism 1A.

Then, the ratchet shaft 33*d* is fixed concentrically to the supply-side rotational shaft 121. Specifically speaking, as has been described above, the ratchet shaft 33*d* is formed concentrically as part of the inserting shaft 33. Further, the ratchet gear 84 that includes the locking claw 84*b* which is the ratchet rotational member, the second clutch gear 82, the intermediate gear 62, the small gear 63 and the fixed gear 64 make up a second rotational connection mechanism 2A. The ratchet shaft 33*d* and the take-up side rotational shaft 122 are connected together rotationally so as to transmit a rotational force by the second rotational connection mechanism 2A.

Namely, the intermediate gear 62, the small gear 63 and the fixed gear 64 make up the second rotational connection mechanism 2A while making up the first rotational connection mechanism 1A.

Here, as has been described above, since the ratio of the rotation speed of the locking claw 84*b* to the rotation speed of the ratchet shaft 33*d* is set to be greater than one, in the event that the rotational force is transmitted by the first rotational connection mechanism 1A, the locking claw 84*b* that is the ratchet rotational member rotates faster than the ratchet shaft 33*d*. Consequently, the locking claw 84*b* that is the ratchet rotational member is not brought into locking engagement with the ratchet teeth on the ratchet shaft 33*d*, and the locking claw 84*b* that is the ratchet rotational member rotates (spins) relative to the ratchet shaft 33*d*.

On the other hand, when a small degree of sticking of the transfer tape T takes place, the first clutch 60 is actuated to operate, and only the supply bobbin 31 and the supply-side rotational shaft 121 (the inserting shaft 33) rotate. Then, the locking claw 84*b* that is the ratchet rotational member is brought into locking engagement with the ratchet teeth of the ratchet shaft 33*d*. When the locking claw 84*b* and the ratchet shaft 33*d* are locked together, the rotational force of the supply-side rotational shaft 121 is transmitted to the take-up side rotational shaft 122 via the ratchet shaft 33*d* by the second rotational connection mechanism 2A, whereby the film transfer tool 10 is restored to the normal state.

In addition, as shown in FIG. 7A, the second clutch 80 is disposed between the second clutch gear 82 and the intermediate gear 62. Then, the feed amount of the supply bobbin 31 and the take-up amount of the take-up bobbin 32 via the first rotational connection mechanism 1A are adjusted by the action of the first clutch 60, and the feed amount of the supply bobbin 31 and the take-up amount of the take-up bobbin 32 via the second rotational connection mechanism 2A are adjusted by the action of the second clutch 80. The second clutch 80 can be disposed between any two gear members of the gear members that make up the second rotational connection mechanism 2A or can be omitted as has been described above.

In this embodiment, the first rotational connection mechanism 1A and the second rotational connection mechanism 2A are each described as being made up of the plurality of gears. However, the members of the first rotational connection mechanism 1A and the second rotational connection mechanism 2A that transmit the rotational force are not limited to the gears, and hence, various known transfer members may be adopted. For example, the rotational connection mechanism may be made up of pulleys and a belt or a gear may also be used together therewith.

The constructions of the first clutch 60 and the second clutch 80 are not limited to the configurations according to the embodiment in which the first clutch 60 and the second clutch 80 are made up of the clutch springs 61a, 82a and the first clutch shaft 33c and the second clutch shaft 62a, respectively. Hence, a known clutch construction can be adopted which employs frictional plates. In addition, the relationship between the locking claw 84b and the ratchet teeth on the outer circumference of the ratchet shaft 33d may be reversed. Hence, a configuration may be adopted in which a locking claw that is sprung back radially outwards is provided on the outer circumference of the ratchet shaft 33d, while ratchet teeth are formed on an inner circumferential surface of the ratchet gear 84.

In this embodiment, the first rotational connection mechanism 1A and the second rotational connection mechanism 2A are disposed on the left side surfaces of the supply bobbin 31 and the take-up bobbin 32, which are one side surfaces of the two side surfaces thereof, whereby the film transfer tool 10 can be formed compact.

However, as shown in FIG. 7(b), a first rotational connection mechanism 1B can be disposed on the left side surfaces of the supply bobbin 31 and the take-up bobbin 32, and a second rotational connection mechanism 2B can be disposed on right side surfaces thereof. The supply-side rotational shaft 121 and the take-up side rotational shaft 122 are fixed to the supply bobbin 31 and the take-up bobbin 32 so as to penetrate the supply bobbin 31 and the take-up bobbin 32, respectively. In the modified example shown in FIG. 7B, the first rotational connection mechanism 1B is made up of the first clutch 60, the first clutch gear 61, the intermediate gear 62, the small gear 63 and the fixed gear 64. The second rotational connection mechanism 2B is made up of the ratchet gear 84 including the locking claw 84b that is the ratchet rotational member and gears 123, 124, 125.

In the modified example shown in FIG. 7B, the supply-side rotational shaft 121 that lies on the right side surface of the supply bobbin 31 is fixed concentrically to the ratchet shaft 33d. Further, the gear 125 is fixed to the take-up side rotational shaft 122 that lies on the right side surface of the take-up bobbin 32.

In the modified example shown in FIG. 7B, too, the interlocking mechanism operates similarly. Namely, in the normal transfer operation, the supply-side rotational shaft 121 that lies on the left side surface of the supply bobbin 31 rotates in association with the rotation of the supply bobbin 31, and the take-up side rotational shaft 122 rotates via the first rotational connection mechanism 1B (the first clutch 60, the first clutch gear 61, the intermediate gear 62, the small gear 63, the fixed gear 64), whereby the take-up bobbin 32 rotates. As this occurs, the ratchet shaft 33d rotates which is fixed concentrically to the supply-side rotational shaft 121. Then, the ratchet gear 84 also rotates via the gear 125 that is connected to the take-up side rotational shaft 122 and the gears 124, 123. However, the ratio of the rotation speed of the locking claw 84b to the rotation speed of the ratchet shaft 33d is set to be greater than one, and therefore, when the rotational force is transmitted by the first rotational connection mechanism 1B, the ratchet gear 84 rotates faster than the ratchet shaft 33d and spins.

Then, in the event that a small degree of sticking is generated in the transfer tape T, the first rotational connection mechanism 1B and the second rotational connection mechanism 2B stop rotating. Then, in the event that the transfer operation continues to be performed so that the supply bobbin 31 is forced to rotate, only the supply bobbin 31, the supply-side rotational shaft 121 and the ratchet shaft 33d rotate, and the locking claw 84b and the ratchet shaft 33d are brought into locking engagement with each other. Then, the rotational force of the supply-side rotational shaft 121 is transmitted to the ratchet shaft 33d, the take-up side rotational shaft 122 rotates via the second rotational connection mechanism 2B (the ratchet gear 84 including the locking claw 84b that is the ratchet rotational member, the gears 123, 124, 125) and the second clutch 80, thereby causing the take-up bobbin 32 to rotate. In this way, the film transfer tool 10 in which the small degree of sticking of the transfer tape T takes place is restored to the normal transfer operation.

In this embodiment, the ratchet shaft 33d is formed concentrically with the supply-side rotational shaft 121 as part of the inserting shaft 33. However, the invention is not limited thereto. For example, as shown in FIG. 7C, a configuration may be adopted in which other gears 133, 134 are provided from the supply-side rotational shaft 121, and the ratchet shaft is fixed to the gear 134. However, in case the supply-side rotational shaft 121 is concentric with the ratchet shaft 33d, the film transfer tool 10 can be configured compact.

In the modified example shown in FIG. 7C, a first rotational connection mechanism 1C is made up of the first clutch 60, the first clutch gear 61, the intermediate gear 62, the small gear 63 and the fixed gear 64. A second rotational connection mechanism 2C is made up of the locking claw 84b that is the ratchet rotational member, the second clutch gear 82, the small gear 63 and the fixed gear 64. The ratchet shaft 33d is connected rotationally to the supply-side rotational shaft 121 via the gear 133 that is fixed to the supply-side rotational shaft 121 and the gear 134 that meshes with the gear 133.

Namely, as shown in the modified example shown in FIG. 7C, the ratchet shaft 33d should be connected so as to be rotated by the supply-side rotational shaft 121 and does not have to be connected concentrically to the supply-side rotational shaft 121.

In the modified example shown in FIG. 7C, too, the interlock mechanism operates similarly. Namely, in the normal transfer operation, the supply-side rotational shaft 121 rotates in association with the rotation of the supply bobbin 31, and the take-up side rotational shaft 122 is rotated by the first rotational connection mechanism 1C (the first clutch 60, the first clutch gear 61, the intermediate gear 62, the small gear 63, the fixed gear 64), whereby the take-up bobbin 32 is rotated. As this occurs, the ratchet shaft 33d rotates together with the gear 133 that is fixed to the supply-side rotational shaft 121 and the gear 134 that meshes with the gear 133. Then, the ratchet gear 84 also rotates via the fixed gear 64 that is fixed to the take-up side rotational shaft 122, the small gear 63 and the second clutch gear 82. However, when the rotational force is transmitted by the first rotational connection mechanism 1C, the ratio of the rotation speed of the locking claw 84*b* to the rotation speed of the ratchet shaft 33*d* is set to be greater than one, and therefore, the ratchet gear 84 rotates faster than the ratchet shaft 33*d* and spins.

Then, in the event that a small degree of sticking is generated in the transfer tape T, the first rotational connection mechanism 1C and the second rotational connection mechanism 2C stop rotating. Then, in the event that the transfer operation continues to be performed so that the supply bobbin 31 is forced to rotate, only the supply bobbin 31, the supply-side rotational shaft 121, the gears 133, 134 and the ratchet shaft 33*d* rotate, and the locking claw 84*b* and the ratchet shaft 33*d* are brought into locking engagement with each other. Then, the take-up side rotational shaft 122 rotates via the second rotational connection mechanism 2C (the ratchet gear 84 including the locking claw 84*b* that is the ratchet rotational member, the second clutch gear 82, the small gear 63, the fixed gear 64) and the second clutch 80, whereby the take-up bobbin 32 rotates. In this way, the film transfer tool 10 in which the small degree of sticking of the transfer tape T takes place is restored to the normal transfer operation state.

Thus, while the embodiment of the invention has been described heretofore, the invention is not limited by the embodiment and hence can be carried out in various forms.

What is claimed is:

1. A film transfer tool comprising:
a supply bobbin around which an unused transfer tape is wound and which is supported rotationally;
a take-up bobbin around which the used portion of the transfer tape is wound and which is supported rotationally;
a supply-side rotational shaft that is fixed to the supply bobbin, a take-up side rotational shaft that is fixed to the take-up bobbin, a ratchet shaft that is connected rotationally to the supply-side rotational shaft;
a first rotational connection mechanism that rotationally connects the supply-side rotational shaft and the take-up side rotational shaft together and which includes a first clutch; and
a second rotational connection mechanism that includes a ratchet rotational member that can be brought into locking engagement with the ratchet shaft to cause the ratchet shaft to rotate together with the take-up side rotational shaft,
wherein a ratio of a rotation speed of the ratchet rotational member to a rotation speed of the ratchet shaft is greater than one.

2. The film transfer tool according to claim 1, wherein the second rotational connection mechanism comprises a second clutch.

3. The film transfer tool according to claim 2, wherein a clutch force of the second clutch is smaller than a clutch force of the first clutch.

4. The film transfer tool according to claim 3, wherein the first rotational connection mechanism and the second rotational connection mechanism are connected together rotationally by a plurality of gears and are disposed on one side surface relative to the supply bobbin and the take-up bobbin.

5. The film transfer tool according to claim 4,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

6. The film transfer tool according to claim 3,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

7. The film transfer tool according to claim 2, wherein the first rotational connection mechanism and the second rotational connection mechanism are connected together rotationally by a plurality of gears and are disposed on one side surface relative to the supply bobbin and the take-up bobbin.

8. The film transfer tool according to claim 7,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

9. The film transfer tool according to claim 2,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

10. The film transfer tool according to claim 1, wherein the first rotational connection mechanism and the second rotational connection mechanism are connected together rotationally by a plurality of gears and are disposed on one side surface relative to the supply bobbin and the take-up bobbin.

11. The film transfer tool according to claim 10,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

12. The film transfer tool according to claim 1,
wherein the ratchet shaft is concentric with the supply-side rotational shaft and includes ratchet teeth that are formed on an outer circumference thereof,
wherein the ratchet rotational member comprises a locking claw that is formed so as to be brought into locking engagement with the ratchet teeth, and
wherein the locking claw is biased in the direction of a center of the ratchet shaft.

* * * * *